United States Patent [19]
Reilly

[11] Patent Number: 5,877,482
[45] Date of Patent: Mar. 2, 1999

[54] SECURITY SYSTEM FOR EFT USING MAGNETIC STRIP CARDS

[76] Inventor: Chris Reilly, PO Box 1623, North Sydney 2061, New South Wales, Australia

[21] Appl. No.: 750,552
[22] PCT Filed: Jun. 1, 1995
[86] PCT No.: PCT/AU95/00329
 § 371 Date: Dec. 9, 1996
 § 102(e) Date: Dec. 9, 1996
[87] PCT Pub. No.: WO95/34042
 PCT Pub. Date: Dec. 14, 1995

[30] Foreign Application Priority Data

Dec. 9, 1994 [AU] Australia ................ PM6169

[51] Int. Cl.⁶ ............ G06F 17/60; G06K 5/60; G07F 7/08; B65H 1/00
[52] U.S. Cl. ............ 235/380; 235/379; 235/382; 902/8; 902/25
[58] Field of Search ............ 235/379, 380, 235/382; 902/8, 25

[56] References Cited

U.S. PATENT DOCUMENTS

| | | | |
|---|---|---|---|
| 3,956,615 | 5/1976 | Anderson et al. | 235/61.7 |
| 4,025,760 | 5/1977 | Trenkamp | 235/61.7 |
| 4,186,871 | 2/1980 | Anderson et al. | 235/380 |
| 4,612,532 | 9/1986 | Bacon et al. | 340/347 DD |
| 4,628,195 | 12/1986 | Baus | 235/440 |
| 4,965,568 | 10/1990 | Atalla et al. | 235/379 |
| 5,130,519 | 7/1992 | Bush et al. | 235/380 |
| 5,227,613 | 7/1993 | Takagi et al. | 235/380 |
| 5,295,188 | 3/1994 | Wilson et al. | 380/30 |
| 5,365,589 | 11/1994 | Gutowitz | 380/43 |
| 5,371,797 | 12/1994 | Bocinsky | 380/24 |
| 5,623,547 | 4/1997 | Jones et al. | 380/24 |
| 5,623,557 | 4/1997 | Shimoyoshi et al. | 382/246 |
| 5,650,604 | 7/1997 | Marcous et al. | 235/379 |

FOREIGN PATENT DOCUMENTS

| | | |
|---|---|---|
| 0003 756 | 1/1979 | European Pat. Off. |
| 0032 193 | 12/1980 | European Pat. Off. |
| WO 81/02655 | 9/1981 | WIPO |
| WO 85/02927 | 7/1985 | WIPO |

Primary Examiner—Anita Pellman Gross
Assistant Examiner—Daniel St. Cyr
Attorney, Agent, or Firm—Knobbe, Martens, Olson & Bear, LLP

[57] ABSTRACT

Discretionary data encoded on a track of a magnetic strip card is used to improve the reliability of recovery of the card data and, when coupled with complementary processing in the EFT terminal, protects the PIN on an end to end basis (that is between the transaction terminal and the card issuer), as well as providing for end to end card authentication. An issuing bank encodes cards under the control of a number of encryption and encoding keys which are unique to the Issuer Identification Number (IIN). The result of this is an individual encryption key (Card Key CK) for each card which is derived from this key. The encoded Card Key (CK) which is stored in an encoded form within the track discretionary data is used as the basis of a key to firs encrypt the PIN. The Card Key is combined with transaction variables such as amount of the transaction to produce a unique PIN key for this transaction. The Card Key is not transmitted by the terminal to the controlling computer system. Thus both the encryption of the PIN and authentication of the card is protected from a compromised computer system connected to the transaction terminals.

4 Claims, 4 Drawing Sheets

TRACK 1 ENCODING

*Information encoded:*

*Primary Account Number:* 4561 2380 1234 5678

*Card Holder Name:* Ms Public A Servant

*Expiration Date:* 12/99

*Service Code:* 727

*Format Code:* $

*Discretionary Data:* 9999-99999 (24 characters)

|%4564123801234 5678^Servant/Public A.Ms^727$99999999999-9999L?|

FIG. 1

SECURITY SYSTEM FOR EFT USING MAGNETIC STRIP CARDS

The present invention relates to the security, reliability and practicability of electronic transactions involving the use of magnetic strip cards and Personal Identification Numbers.

BACKGROUND OF THE INVENTION

There are over one billion magnetic strip cards which are used as the basis of debit and credit financial transactions. These cards are being increasingly used in association with Personal Identification Numbers (PINs). Typically these PINs are encrypted in Electronic Funds Transfer (EFT) terminals using symmetric algorithms such as that specified in the Data Encryption Standard (DES). While much effort has gone into formulating security measures within these term experience has shown that the greatest security risk is associated with the computers which control the operation of these terminals. A fundamental property of algorithms such as the DES is that it is impossible to prove that a copy of the encryption key which has been used to encrypt the PIN and is under the control of the computer systems operator has not been obtained by some third party. Thus with current practice the magnetic strip image and the PIN can be recovered from the terminal transmission and the attacker is in a position to derive benefit from the card holders account until the funds are exhausted or a fraud is detected. Further frauds can be committed because these systems are forced to allow manual entry of card numbers as a result of the poor quality and reliability of magnetic strip encoding.

A further limitation of magnetic strip technology is the amount of information which can be encoded on the card particularly given the limitations imposed by the International Standards Organisation (ISO).

Yet another limitation of current practice is that PINs can not be safely stored in computer systems since the means to decrypt them into clear text is also usually present. This leads to a situation where all PIN driven transactions must be transmitted to a computer system which has the means of verifying the PIN validity in real time. Such computers must of necessity contain the means of producing apparently valid PINs. In a large scale international scheme deployment of such facilities in many countries is dangerous in that it may expose large banks to attack as a result of compromised facilities in foreign counties or cause problems for their card holders as a result of unreliable communications links.

The problem of card authentication is also serious in that data encoded on a magnetic strip card can be readily generated from data transmitted to the computer system. Thus the card issuer has no proof that the transaction was originated on the basis of the physical card, since it could have been generated from the data contained in a previous transaction.

SUMMARY OF THE INVENTION

According to a first aspect, the present invention provides a method of encoding a magnetic strip card to enable validation of the card by an issuing organisation during an electronic transaction, the method comprising the steps (a) generating a unique card key for the magnetic strip card prior to issue, which is not readily derived from any other data recorded on the card, (b) recording the card key on the magnetic strip of the respective card prior to issuing the card to a client, (c) recording the card key with card details in a secure database.

According to a second aspect, the present invention consists in a method of encoding a magnetic strip card to enable validation of the card by an issuing organisation during an electronic transaction, the method comprising the steps of (a) generating a unique card key for the magnetic strip card prior to issue, which is independent of any data visibly recorded on the card, (b) generating a Personal Identification Number (PIN) associated with the card, (c) recording the card key on the magnetic strip of the respective card prior to issuing the card and PIN to a client, (d) recording the card key and PIN with card details in a secure database.

According to a third aspect, the present invention provides a method of validation of a magnetic strip card during an electronic transaction wherein data stored an the magnetic strip card is read by a transaction terminal following which the terminal transmits a transaction message including card details and transaction details to an issuing organisation which issued the card, either directly or via intermediate processors, where a card key forming part of the stored data read from the card was recorded in a secure database at the time of card issue, the method comprising the steps of:

(a) the transaction terminal encrypting a part or all of the transaction message using the card key read from the card, the encryption being performed with a one way function, (b) the transaction terminal transmitting to the issuing organisation the transaction message, including encripted and non-encripted data, the non encripted data including a subset of the card details read from the card, the subset being sufficient to uniquely identity the card, and wherein the subset does not include the card key, (c) the issuing organisation, after receiving the transmission of the transaction message, identifying the card and recalling the card key for that card from its records, and examining the encripted data using the card key and the one way function to verify that the transaction is valid.

In one embodiment not involving use of a PIN verification is performed by de-cripting the encripted card details and comparing the de-encripted details with un-encripted card details or card details held in the secure database, while in an alternative embodiment, verification is performed by encripting un-encripted card details or card details held in the secure database and comparing these encripted details with the encripted card details of the transaction message.

In yet a further alternative, verification is performed by de-encripting the encripted data and examining unique transaction details for validity. The unique transaction details may include a unique transaction identifier, or a time stamp.

In a preferred embodiment the secure database includes a customer Personal Identification Number (PIN) known to the card holder, the encripted data of the transaction message includes the PIN and the verification comprises recalling the PIN from the records of the issuing organisation and comparing the encripted PIN with the recalled PIN.

In the preferred embodiment the encrypted PIN is de-encrypted to perform the comparison, however, it is also possible to encrypt the recalled PIN and compare this with the encripted PIN from the transaction terminal.

Typically, the transaction details transmitted by the transaction terminal to the issuing body will include the transaction value, a transaction serial number and a code identifying the transaction terminal. In a financial transaction, the transaction value will be the financial value of the transaction, however, in other types of transactions, the value will have another relationship with the transaction data.

In a preferred embodiment at least one specific detail of each transaction is used as a second key when encrypting the PIN. The specific detail being one of the details transmitted to the issuing body and the issuing body using the second key with the card key to de-crypt the PIN. Comparing the proposed transmission format with prior art formats, the part of the original card image that would have contained the card key is replaced by the product of a one way function containing at least one specific detail of the transaction and the card key. Thus, cards which are manufactured from intercepted traffic can be readily identified as can the source of the data used to manufacture them. This protection is afforded to card images and transactions with and without the use of a PIN.

The at least one specific detail used to encode the PIN will preferably be the transaction value. In further embodiments of the invention, details provided by the transaction terminal are also used to encrypt the PIN. These further encryption key data may be, for example, a transaction sequence number generated by the terminal and/or terminal identification code.

According to a fourth aspect, the present invention provides a method of encoding data on a magnetic strip card including the steps of formulating an encoding table containing n codes randomly ordered by an index, breaking the data to be encoded into groups of m bits, recursively dividing the value of each m bit group by (n–k), where k is a small odd value, successively using the remainder of each division as an index value to select a code from the encoding table, and encoding the selected code as the next character on the magnetic strip card.

In the preferred embodiment, the encoding table has 43 randomly ordered codes (i.e. n=43), the data is grouped into 16 bit groups (i.e. m=16), each group being limited to having a maximum possible value of 64,000 and the groups are recursively divided by 40 (i.e.,n–3). In embodiments in which the 16 bit groups have a maximum value of 65,535, the groups are recursively divided by 42 (i.e., n–1).

According to a fifth aspect, the present invention provides a magnetic strip card reading terminal including:

(a) magnetic strip card reading means to read card data including a card key from a magnetic strip on a magnetic strip card, (b) transaction detail input means to enable a set of transaction data to be entered into the terminal, (c) encryption means arranged to encrypt a subset of the card data or transaction data using the card key as the encoding key in a one way function.

(d) transmission means arranged to directly or indirectly transmit the encrypted data and other un-encripted card and transaction details to an issuing organisation who issued the card.

In a preferred embodiment the transaction detail input means includes a data entry means which enables a Personal Identification Number (PIN) to be entered and a card holder PIN is transmitted with the card details.

BRIEF DESCRIPTION OF THE DRAWINGS

An embodiment of the invention will now be described with reference to the accompanying drawings in which:

FIG. 1 shows an example of a track data layout of a magnetic strip debit card, indicating the discretionary data block which is redefined in embodiments of the present invention to provide space for the card key and other required data;

DETAILED DESCRIPTION OF EMBODIMENTS

Figure 2:
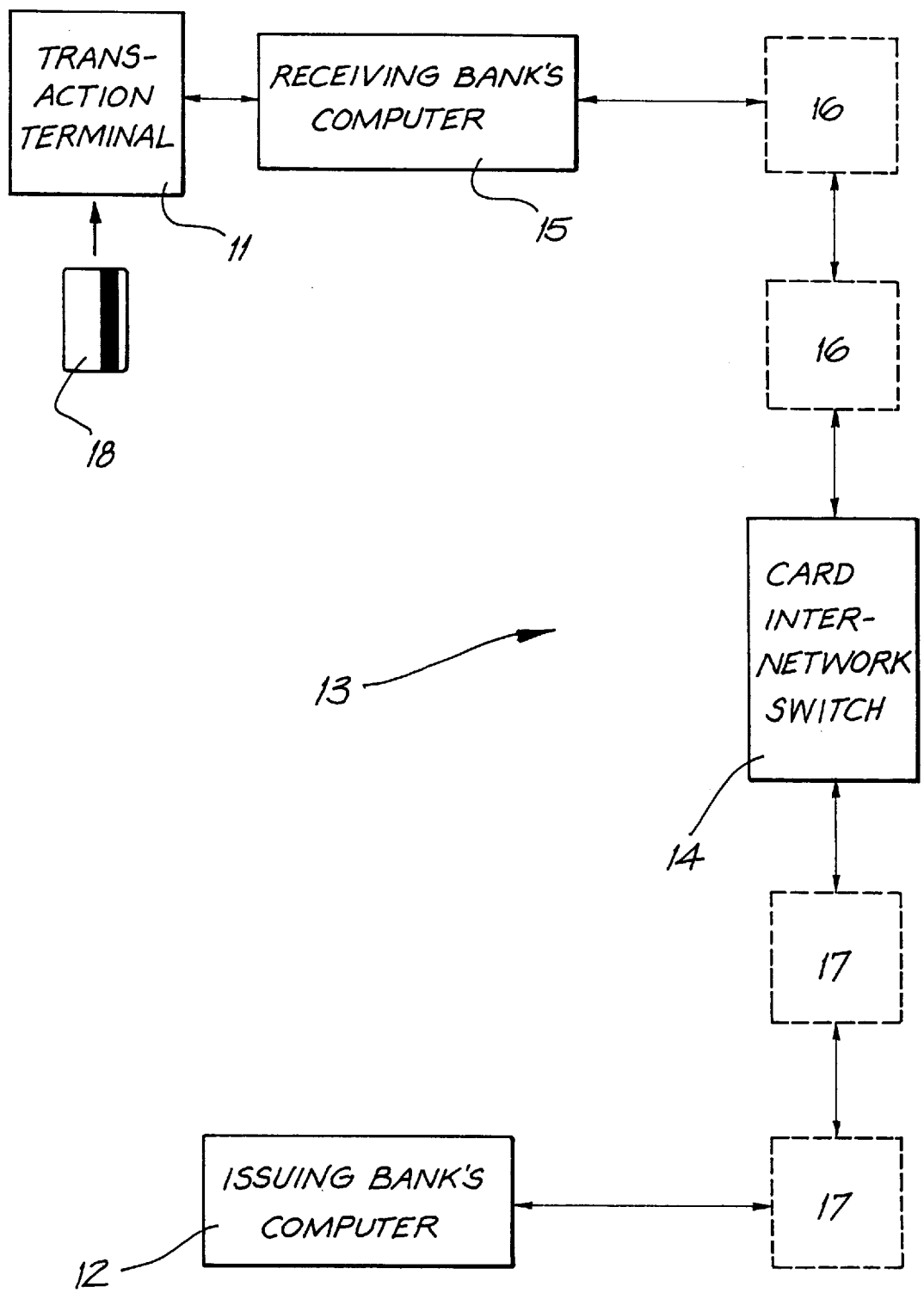
FIG. 2 schematically illustrates an electronic funds transfer network.

Referring to FIG. 2, an Electronic Funds Transfer (EFT) transaction is usually initiated from a retail transaction terminal 11 which is connected to a controlling computer 12 of the issuing bank via a network 13 including a central computer operating as a card inter-network switch 14. The transaction terminal 11 will generally be connected to the network 13 via the Acquiring Bank's computer 15 which will in turn be connected to the card inter-network switch 14 either directly or via the computers of other intermediate organisations 16. Similarly the card inter-network switch 14 is connected to the computer of the issuing bank 12 either directly or via the computers of intermediate organisations 17.

Figure 3:
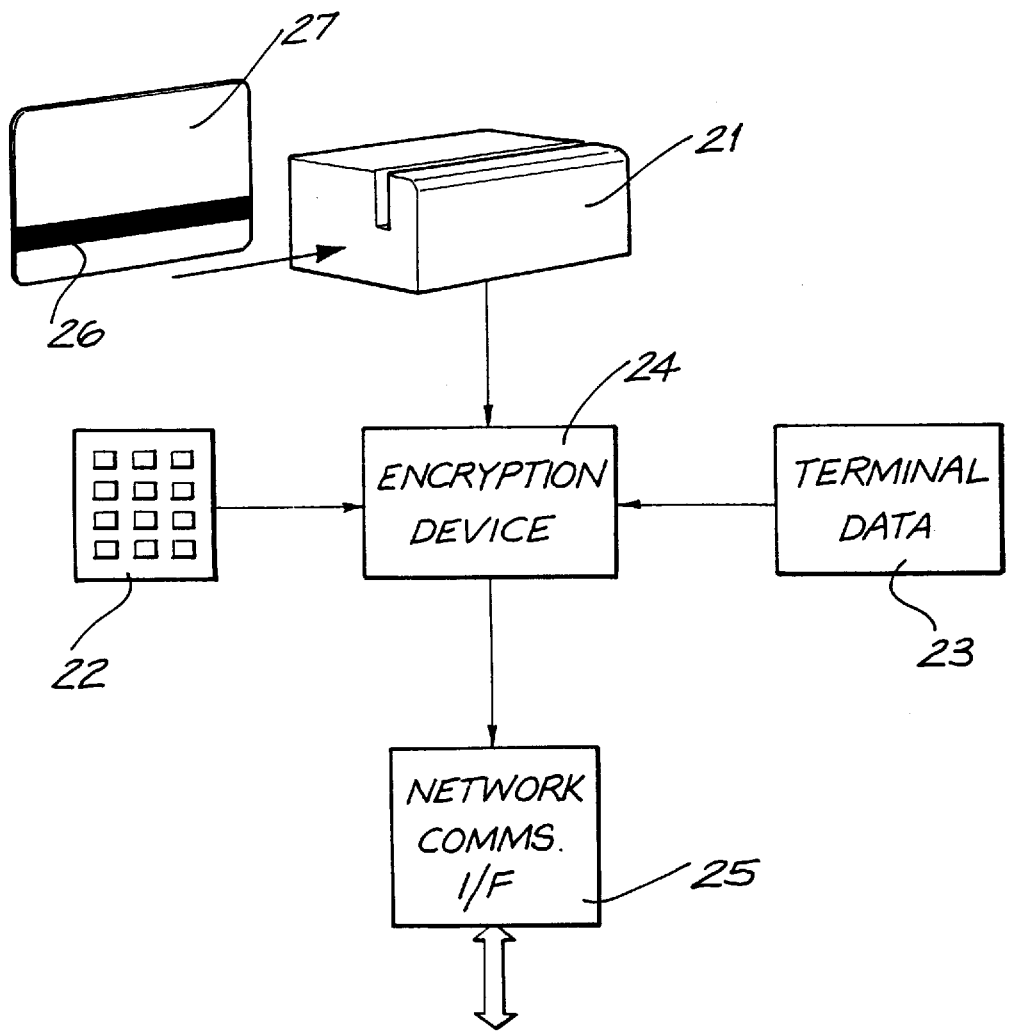
FIG. 3 schematically illustrates the components of an electronic funds transfer terminal which are used for data encryption in an embodiment of the invention.
Figure 4:
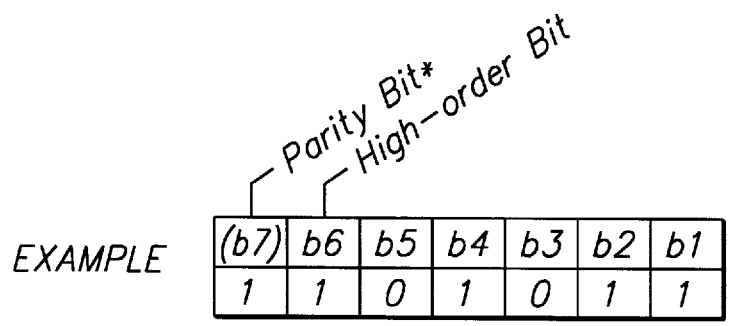
FIG. 4 shows the character set for encoding information on track 1.

Components of the electronic funds transfer (EFT) terminal which forms part of the network of FIG. 2 are shown in more detail in FIG. 3. The terminal includes a card reader 21 which reads the magnetic strip 26 of a card 27 to obtain a unique card key which is not visibly represented on the card. The terminal also includes a PIN entry keyboard 22, a terminal date generating circuit 23, an encryption means 24 and a network communications interface 25. The PIN entry keyboard 22 try also be used for transaction detail entry, or the transaction details may alternatively be transmitted via a communications channel from a cash register or other point of sale terminal device. The terminal data generating circuit 23 is preferably arranged to provide a unique terminal identifying number and a transaction serial number for that terminal. By concatenating these numbers a unique identifying number for the transaction may be obtained. The encryption means 24 receives data from the card reader 21, the PIN entry keyboard 22, including the transaction details if these have been keyed in, and the terminal data generating circuit 23 and encrypts some details of the transaction which may include card data, transaction data and the PIN using one of the methods as hereinafter described. It should noted that not all transactions involve the use of a PIN, however the present invention is equally effective in protecting the integrity of a card used in these transactions. The encrypted PIN and/or other terminal and transaction details are then transmitted to the issuing bank 12 by the communications interface 25 and the network of FIG. 2.

Turning now to FIG. 1 embodiments of the present invention use the discretionary data encoded on track 1 of a magnetic strip card in a novel way to improve the reliability of recovery of the card data and, when coupled with complementary processing in the EFT terminal, protects the PIN on a end to end basis (that is between the transaction terminal and the card issuer), as well as providing for end to end card authentication. Preferred embodiments also incorporate an intermediate form of PIN verification which we have termed PIN Credibility Checking (PCC). Thus the reliability and security of transactions may be improved without the need to replace the encoding technology employed to encode over one billion existing magnetic strip cards. The scheme is totally consistent with the standards for card encoding published by the International Standards Organisation. The preferred embodiment of the invention utilises encoding methods which are as close as practical to the theoretical maximum methods which could be employed.

The scheme involves the provision of a software program which allows an issuing bank to encode cards under the control of a number of encryption and encoding keys which are unique to the Issuer Identification Number (IIN). The result of this is an individual encryption key (Card Key CK) for each card which is derived from this key. All such keys may be held secret by the bank that encoded and issued the card except that some encoding information will be made available to those manufacturers who are constructing terminals to support the scheme.

The encoded Card Key (CK) which is stored in an encoded form within the track 1 discretionary data (refer to FIG. 1) is used as the basis of a key to first encrypt the PIN. The Card Key is combined with transaction variables such as amount of the transaction to produce a unique PIN key for this transaction. The Card Key is not transmitted by the terminal to the controlling computer system. Thus both the encryption of the PIN and authentication of the card is protected from a compromised computer system connected to the transaction terminals.

The encoding scheme which utilises radix 43 and 40 arithmetic and a number of 43 character value tables provides for far more information than that currently available on the card. The encoding tables themselves represent a form of encryption with a long length key.

Different encoding tables are used for different fields within the card and access to the encoding information is restricted to those who have a legitimate need to know their values.

CARD KEY

A problem with any terminal key management scheme used to protect PINs and generate Message Authentication Codes (MACs) is that a terminal is a finite state machine. Thus If the information process within the terminal is known and all the data which is input to the process is known then the result is known. If the information process is symmetric as in the case of the Data Encryption Standard (DES) then the input to the process can be determined by those who have access to the terminal information.

Thus any person who has a copy of the information contained within the terminal can determine the clear text value of the PIN from the terminal transmission if all the input data is transmitted from the terminal. Embodiments of the present invention use an encoded Card Key (CK) which is used to first encrypt the PIN. This Card Key (CK) is not transmitted by the terminal to the computer. Thus the PIN is encrypted using a key which is only known to those who encoded the card or had access to it without this protection feature and have knowledge of the encoding scheme tables and the terminal processing scheme and the value of the data transmitted from the terminal. The Card Key (CK) is unique for each card and may be derived from a master key and the Primary Account Number (PAN) using a cryptographic one way function. The master key will typically be unique for each range of PANs which belong to a card issuer identification number (IIN).

Further the card key is replaced in the card image transmitted from the terminal with a value unique to the transaction combined with the card key using a one way function thus preventing undetected reuse of the card image transmitted from any terminal.

FORWARD ERROR CORRECTING CODE

Magnetic Strip cards have up to a 6% failure rate. Any effective security system to prevent simple card fabrication and copying will rely on encoded information and thus will preclude the manual keying of Primary Account Numbers (PANS) for unreadable cards.

An error correcting code has been encoded using a different packing scheme from that used to encode the card key. Thus error correction may be implemented without access to the Card Kay encoding table. This error correcting code process is preferably applied after error correction based on the comparison of like date on tracks 1 and 2 is completed.

Alternatively a Cyclic Redundancy Check code can be included with a small Error Correcting Code. Typically the field will include a 16 bit Cyclic Redundancy Check code and a error correcting code which applies to the Cyclic Redundancy Check code. This approach is appropriate for use in dual track terminals where use can be made of the redundancy of the information recorded on both tracks of the card.

PIN CREDIBILITY CHECKING

A polynomial based on prime numbers has been implemented. The result of division by a variable devisor is encoded on the card. The result is referred to as the Partial PIN Remainder (PPR). THE PPR can be used to detect simple PIN entry errors without the prior disclosure of keys used to generate or verify the complete PIN value.

CARD VERIFICATION VALUE

A Card Verification Value is also encoded to provide compatibility with existing practice. This value when decoded has the same value as that which may also be encoded on track 2. The encoding tables for this value are different from those used for encoding the Card Key and the Forward Error Correcting (FEC) code and Partial PIN Remainder (PPR).

FORMAT CODE

A single character which is not the subject an encoding scheme is used to indicate the unencoded layout of the discretionary data on track 1. Three values have been chosen which are not currently used in normal industry practice. Two of the values are used to indicate the absence of a FEC and are used to indicate numeric or other discretionary data in accordance with the scheme described below. This position is used to indicate the Pin Verification Key Index (PVKI) in current industry practice. The PVKI and its associated field the PIN Verification Value PVV are also encoded in accordance with the scheme described below.

The value $ is used to indicate the presence of the PVKI PVV CVV FEC PPR and CK.

Values 0–9 indicate non-packed format

Values A–Z are available for use for other formats.

The values ),(, $ are used by the following formats and were chosen because they are not currently in use.

DATA FIELD LAYOUT

The data is encoded in separate fields. The fields are encoded in the order Format Code (FC) PVKI and PVV CVV PPR FEC and CK.

The scheme provides for an 8 bit PPR value a 24 bit FEC value and a 64 bit CK value. The currently used values of the PVKI PVV and CVV are supported by the encoding scheme.

THE ENCODING SCHEME

The value to be encoded is first divided into groups of 16 bits. Each 16 bit value is recursively divided by the value 40 or 42 depending on the maximum value of the field content and the available field size. Each successive remainder is used as an index to select a character value from the encoding table associated with that field. The selected character is encoded on the card. The value 40 is preferred where possible in the interests of speedy implementation in low power central processing units (CPUs). Each encoding table contains all 43 possible values of a character without special meaning which may be encoded on track 1. The character set used on track 1 is shown in FIG. 3.

FORMAT "$"

Allows for Partial PIN Remainder (PPR), error correcting code and a card Key as well as currently employed fields such as PVKI PVV and CVV.

PARTIAL PIN REMAINDER—8 BITS

The Partial PIN Remainder for 6 or 6+digit PINs is the value $$PPR=((P1+P2\times3+P3\times5+P4\times7+P5\times11+P6\times13) \text{ REM } Z+I) \text{ XOR } PK$$

Where REM indicates the remainder after division function and XOR indicates the exclusive or function (i.e., binary addition without carry).

Z and I are allocated as the following valid pairs.

Z=127, I=128
Z=31, I=96
Z=23, I=73

PPR values 64,65,66,67,68,69,70,71,72 indicate that there is no partial PIN but that the PIN length is 4,5,6, etc digits.

PPR values 0–63 are reserved.

A non-zero value may be assigned to the value PK to further improve the security of the scheme.

ERROR CORRECTING CODE—24 BITS

A 24 bit field is used for error detection and correction codes and is based on data on data such as the PAN and other critical data thus drastically lowering the rate of undetected errors. To the extent that these protection codes cover data such as the card key are based on, the encoded card image and do not require access to other mapping tables.

FORMAT "("

This format provides for issuers who wish to encode 8 decimal digits of numeric data in the 6 character field. This is the maximum size available on track 2 for discretionary data with a 16 digit PAN but WITHOUT a CVV. The encoding scheme is based an successive division by 40 after the binary value has been split into two 16 bit values after by division by 65536 (2 exp 16). The maximum value available is 4,294,959,999, but in practice will preferably be restricted to a maximum value of 99,999,999.

No provision has been made for encoding separators.

FORMAT ")"

The ")" format provides for those who wish to encode alpha numeric discretionary data on track 1 and hence will be different to that encoded on track 2. All 43 allowed track 1 characters are possible.

CARD KEY—64 BITS

The Card Key is a key unique to the card and is used with transaction variable data such as the amount of the transaction and terminal identification number to generate a unique PIN key which is used to encrypt the PIN prior to any other form of encryption. This prevents attacks based on recording the encrypted PIN block and utilising the encrypted information as the basis for a new fraudulent transaction.

The key can be derived from a double length key per issuer Identification Number (IIN). This process involves encryption of the Primary Account Number (PAN) with the first key associated with the IIN (KI1) decryption of the result with the second key (KI2) and then re-encryption of the result of that calculation with the first key (KI1).

Thus a copy of the keys KI1 and KI2 can be conveyed to a central card organisation to allow stand-in PIN verification or conversion to existing PIN encryption or retained by the issuer to provide end-to-end protection. In any case the method affords protection from compromised acquirer and retailer systems when an appropriate terminal is used.

ENCODING TABLES

Each encoding table (J–N) consists of two parts.

The first part is a table of 43 7 bit character values including parity. Each table contains these characters in a randomly chosen order each of which is one of the 43 valid characters allowed on track 1. A–Z, 0–9, SP, $, (, ),./&-

The encoded value is developed by successive division.

The second part of the table consists of the inverse and is a 64 byte sparse table containing a numeric value in the range 0–42 and indexed by the corresponding parity removed character value. The unencoded value is developed by successive multiplication. The described embodiments of the invention provide the following benefits over prior art systems:

(a) a unique card image is used per transaction thus ensuring that card images from any point in the network can not be used for subsequent transactions;

(b) a method is provided for authenticating the card used for the transaction on the basis of information only available to the card issuer;

(c) the card image is protected from alteration;

(d) it is almost impossible to produce cards from data contained in receipts and other transaction related information;

(e) the reliability of magnetic strip cards used in conjunction with devices using embodiments of this invention is greatly improved through improved error detection and correction;

(f) the PIN is protected from compromise by acquirers, network operators, retailers and other service providers;

(g) additional processing strategies are provided by enabling store and forward debit transaction processing and immediate terminal based PIN credibility checking;

(h) a low cost method of securing card transaction based networks is provided which is compatible with existing networks;

(i) a feasible key management strategy is provided without resort to centralised key management centers;

(j) a low risk incremental improvement to existing networks is provided.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

I claim:

1. A method at encoding data on a magnetic strip card including the steps of formulating an encoding table containing n codes randomly ordered by an index, breaking the data to be encoded into groups of m bits, recursively dividing the value of each m bit group by (n−k) where k is a small odd value, successively using the remainder of each division as an index value to select a code from the encoding table, and encoding the selected code as the next character on the magnetic strip card.

2. The method of claim 1, wherein the encoding table has 43 randomly ordered codes (i.e. n=43).

3. The method of claim 2, wherein the data is grouped into 16 bit groups (i.e. m=16), each group being limited to having a maximum possible value of 64,000 and the groups being recursively divided by 40 (i-e., n−3).

4. The method of claim 2, wherein the data is grouped into 16 bit groups (i.e., m=16) each group being limited to a maximum value of 65,535, and the groups being recursively divided by 42 (i.e., n−1).

* * * * *